Oct. 14, 1958
J. R. ALBURGER
2,855,781
STABLE REFERENCE PLATFORM
Filed June 18, 1956
4 Sheets-Sheet 1
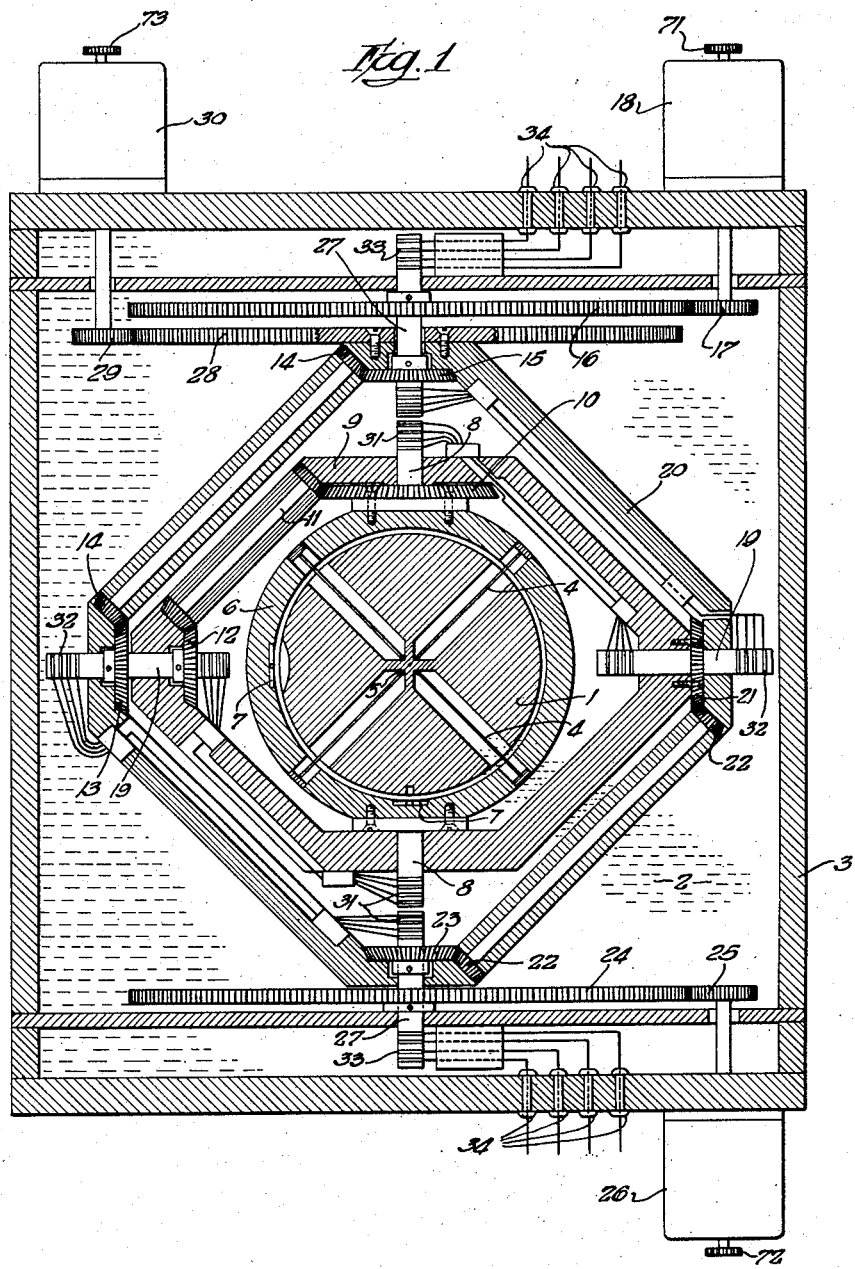
INVENTOR.
JAMES R. ALBURGER
BY
ATTORNEY.

Oct. 14, 1958  J. R. ALBURGER  2,855,781
STABLE REFERENCE PLATFORM
Filed June 18, 1956  4 Sheets-Sheet 2
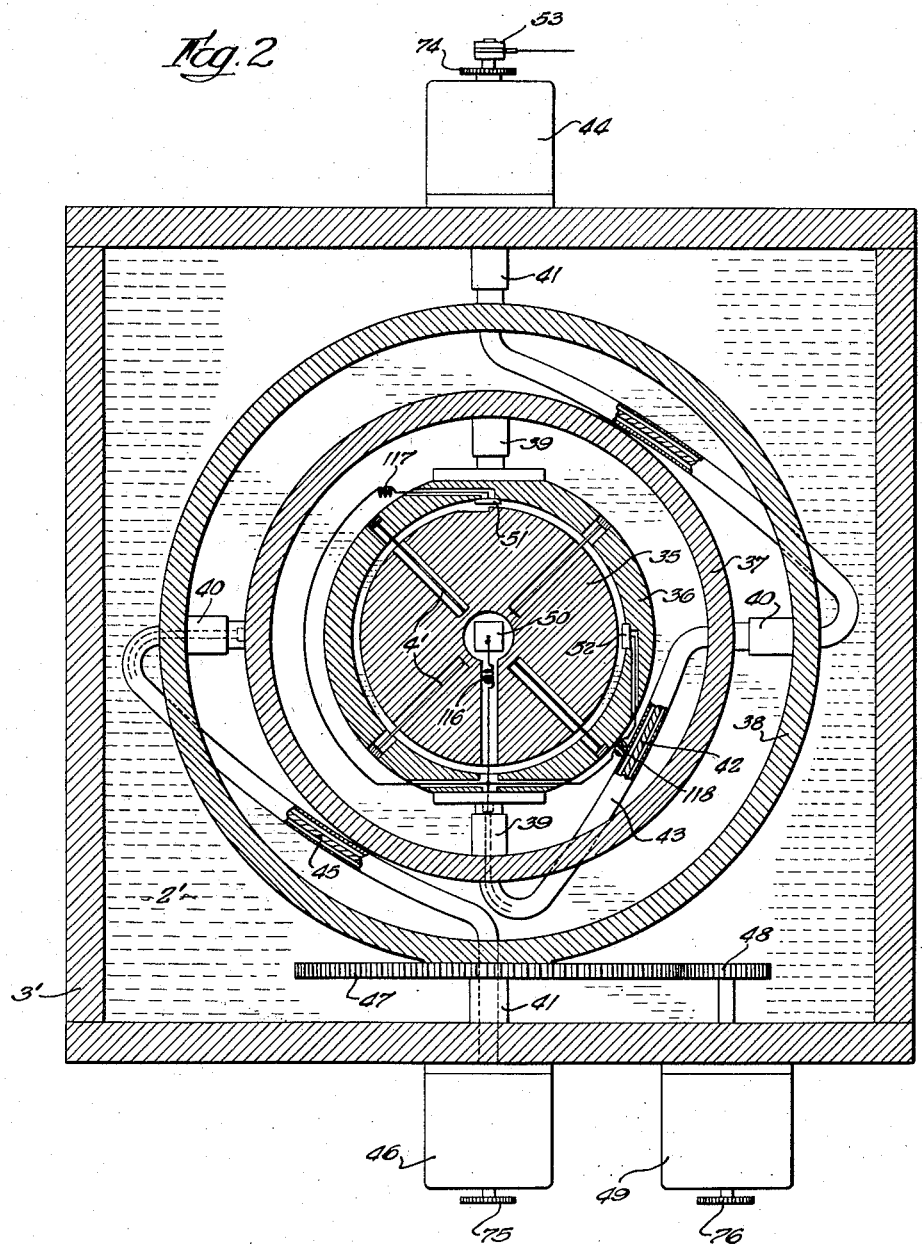
INVENTOR.
JAMES R. ALBURGER
BY
ATTORNEY.

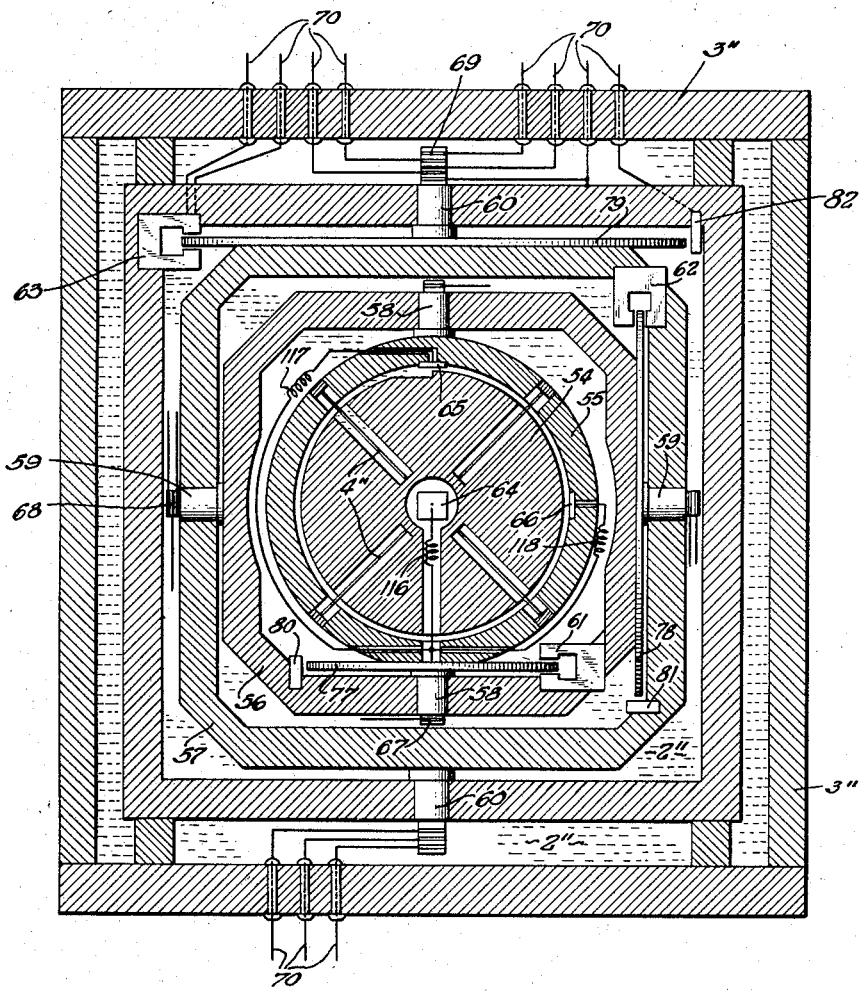

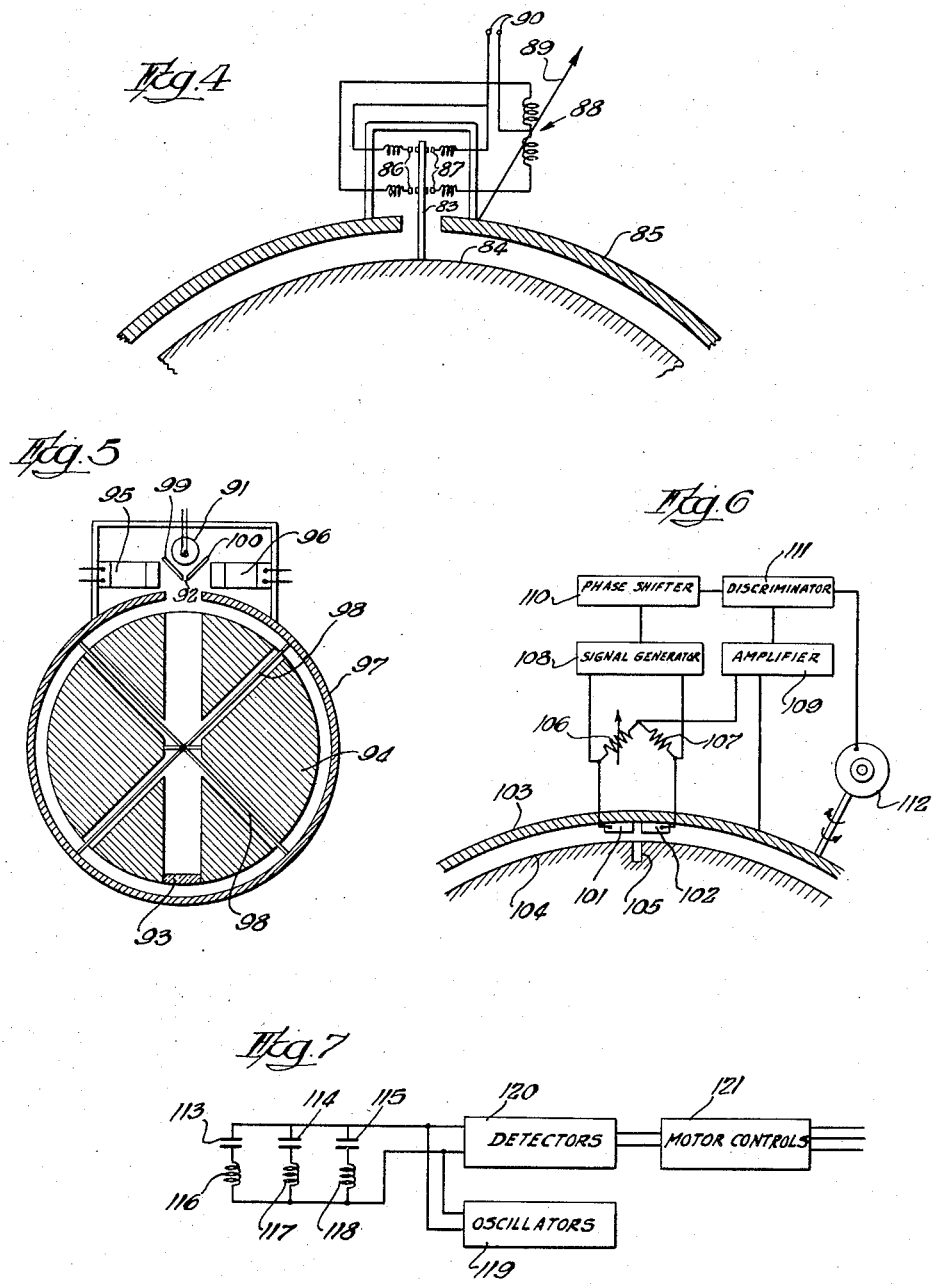

United States Patent Office 2,855,781
Patented Oct. 14, 1958

2,855,781

STABLE REFERENCE PLATFORM

James R. Alburger, La Canada, Calif.

Application June 18, 1956, Serial No. 592,082

20 Claims. (Cl. 74—5)

This invention relates to gyro apparatus and particularly to a so-called stable reference platform which is relatively unaffected by external forces.

The use of gyroscopically stabilized compasses in the navigation of boats or aircraft is well known. Such compasses depend for their operation on the scientific law of conservation of angular momentum, and have been developed to a high degree of precision and have proved to be highly satisfactory for use in sea-going ships and aircraft. However, such compasses are not entirely satisfactory for other uses, particularly in guided missiles where great acceleration and severe vibration forces are encountered.

In existing missiles, forces may be encountered which have the magnitude of the order of ten to twenty gravities. With the new types of missiles, satellite projectiles and space craft, the magnitude of acceleration and vibration forces will probably become even greater. The effect of such forces on existing gyro stabilized platforms is to introduce friction loading on bearings, thus causing gyros to precess and lose their control. Another factor of importance is the matter of cost, some precision aircraft compass devices being extremely expensive. To incorporate equipment of this nature in guided missiles, even assuming they could be made to perform satisfactorily, would greatly increase the cost of the missile.

The principal object of the invention, therefore, is to facilitate the stabilization of a reference platform.

Another object of the invention is to provide an improved system for inertial guidance and control of missiles, aircraft, and space craft.

A further object of the invention is to provide an improved stable reference platform which is relatively inert and unaffected by large accelerations and severe vibration forces.

A still further object of the invention is to provide an improved device for sensing orientation which is low in cost and relatively easy to construct.

The novel features which are believed to be characteristic of this invention, both as to the manner of its organization and the mode of its operation, will be better understood from the following description when read in conjunction with the accompanying drawings, in which:

Fig. 1 is a diagrammatic plan view showing a mechanism embodying the invention and wherein a gimbal system is actuated by electric motors and gear trains;

Fig. 2 is a diagrammatic plan view showing a mechanism embodied in the invention and wherein an inner gimbal and slave housing are actuated by flexible shafts and an outer gimbal is actuated by a gear train;

Fig. 3 is a diagrammatic plan view showing a mechanism embodied in the invention wherein the gimbals are actuated by self-contained induction motors;

Fig. 4 is a detail view showing an electrical contact unit for sensing the orientation of a slave housing with respect to a central core;

Fig. 5 is a detail view of an optical unit for sensing the orientation of a slave housing with respect to a central core;

Fig. 6 is a detail view showing an electronic capacitive unit for sensing the orientation of a slave housing with respect to the central core; and Fig. 7 is a diagrammatic view showing a sensing and control system employing resonant circuits.

There are four essential features involved in the operation of the invention. First, there is a stable central core which floats in a fluid with relatively small restraint, the central core having a tendency to maintain a constant angular displacement. Second, the slave housing encloses the central core, means being provided for sensing or detecting any angular displacement of the slave housing with respect to the core. Third, a system of gimbals is provided with means for restoring the slave housing to the so-called position "zero" following any angular displacement of the slave housing with respect to the central core. Fourth, means are provided for sensing the orientation of the outer housing of the mechanism with respect to the slave housing to provide a reference condition which is utilized to control or guide a missile or aircraft.

Referring now to Fig. 1, a central core 1 is suspended in a fluid 2 which precisely matches its specific gravity. The fluid 2 surrounds the entire mechanism and is contained within an outer housing 3. All of the internal mechanism components are constructed of a light-weight metal, such as aluminum, magnesium, or a similar light-weight non-metallic material. The components have the same specific gravity, such as 2.76, which is the specific gravity of a common aluminum alloy (24ST). Although this aluminum alloy is given as an example, other alloys of other metals or non-metallic materials, such as plastic and glass, may be used.

The interior of the housing 3 is completely filled with the liquid 2, the specific gravity of which closely approximates that of the material used for the internal mechanism which, as mentioned above, may be 2.76. Such a liquid may be prepared by mixing the correct proportions of diiodomethane (sp. g.=3.32) and 1.3 diiodopropane (sp. g.=2.56). There are a large number of liquid mixtures which will match the specific gravity of aluminum, and still more which will match the specific gravity of magnesium, but I have found that various aliphatic halides, particularly the iodides, are most convenient to use as a base for such liquid mixtures. A mixture of diiodomethane and diiodopropane is relatively colorless and non-corrosive on aluminum. Organic halides should never be used in an admixture with other organic liquids in the presence of aluminum because of the well known Friedel and Crafts reaction, wherein aluminum or aluminum salts serve as a catalyst. In such mixtures, aluminum is attacked, corroded, or otherwise decomposed. Aside from this limitation, I have found no objection to the use of any non-corrosive liquid mixture having the required specific gravity except where optical sensing methods are used, in which case it is necessary that the liquid mixture be relatively clear and free of color so that it will transmit light. With the specific gravity of the liquid 2 accurately adjusted to equal the specific gravity of the mechanism in housing 3, the mechanism becomes free-floating and inert to external forces to the extent that any linear acceleration of housing 3 will produce no stresses on any of the internal mechanism or components thereof.

Such a free-floating system has several advantages. It is inert to linear acceleration, shock, and vibration. At the same time, the central core 1 tends to maintain a constant orientation or angular momentum, and, therefore, produces an ideal stable reference platform in its characteristics. However, the invention embodies a means for observing and utilizing the orientation of the core 1 with respect to the housing 3, together with means for correcting for any effects of drag due to any liquid viscosity, or gear and bearing friction which may tend to alter the orientation of the core 1.

The central core is suspended in its central position by means of suspension elements 4, which may be extremely fine quartz fibers or fine aluminum wires or springs. Although the attachment of the suspension elements 4 may be accomplished in any suitable manner, it is preferable that they be attached to the central core at a point 5, which is as close as possible to the geometrical center of the core. This will produce a minimum of restraint on the core 1. The core 1 may take a variety of forms, the simplest form being a sphere which is substantially solid except for holes or openings through which the suspension elements 4 pass. Another form would be a hollow spherical shell wherein the bulk of the mass of the core is concentrated in the shell. Since the moment of the inertia of a solid sphere of mass M and radius $r$ is $2/5\ M\ r^2$, and the moment of inertia of a similar spherical shell is $2/3\ M\ r^2$, the possible improvement in stability through use of a spherical shell is a factor of 1.66. The hollow sphere arrangement permits a practical increase of about 50% in the moment of inertia of a solid sphere for given conditions of sphere size and total mass. This increase represents an improvement in the stability against angular displacement of the central core.

Furthermore, the shape of the central core can be other than spherical. The central core 1 is surrounded by a slave housing 6 which contains provisions for attaching the suspension elements 4 and also elements 7, which are capable of sensing the orientation of the slave housing 6 with respect to the core 1. The slave housing 6 need not entirely enclose the central core 1 but may be merely a framework supporting the essential elements 4 and 7. In turn, this slave housing or framework 6 is supported by shafts and bearings 8 so that it can rotate in an inner gimbal 9. The sensing element 7, as shown in Fig. 1, is a capacitive bridge network as will be described hereinafter, but other devices can be used as will be described infra.

Movement of the slave housing 6 is governed by a gear train wherein a bevel gear 10 is attached to the slave housing 6. The gear 10 is then driven by a gear and shaft assembly 11, which in turn is driven by a train of gears 12, 13, 14, 15, 16, and 17, connected to an electrical motor 18. The electric motor 18 is reversible and its rotation is governed by the sensing network 7 and external electrical circuits so as to always restore the slave housing 6 to a "zero" or balanced position following any angular displacement with respect to the core 1.

Although four suspension elements 4 are shown in Fig. 1, additional suspension elements may be employed in the third dimension out of the plane of the drawing, or as few as two suspension elements may be used which are sufficient to keep the central core 1 centered in the slave housing 6. The inner gimbal 9 is mounted on shafts and bearings 19 so that the gimbal can rotate inside an outer gimbal 20. The axis of rotation of gimbal 9 is at right angles to that of the slave housing 6, while gimbal 9 is driven by a bevel gear 21 which is attached to it. The gear 21 is in turn driven by a train of gears and shafts 22, 23, 24, and 25 connected to a reversible motor 26.

The outer gimbal 20 is mounted on shafts and bearing 27 so that it can rotate within the outer housing 3. The axis of rotation of the gimbal 20 is at right angles to the inner gimbal 9 and is driven by spur gear 28 which is attached to it. Gear 28 is in mesh with a gear 29 connected to reversible motor 30. Electrical connections to the sensing elements 7 are brought out by means of slip ring and brush assemblies 31, 32, and 33. The electrical leads are brought out through the outer housing 3 by means of insulated lead inserts 34.

Fig. 1 shows the gimbal system in so-called gimbal-lock position wherein all of the axes of rotation lie in the same plane. However, the slave housing 6 can assume any orientation with respect to the outer housing 3 by appropriate movement of the slave housing 6 and gimbals 9 and 20.

Referring now to Fig. 2, a central core 35 of the type similar to that described in Fig. 1 is positioned inside a slave housing 36. In this figure, the core 35 is mounted on suspension elements 4'. The gimbal system which comprises the mechanism is substantially the same as in Fig. 1 and consists of an inner gimbal 37 and an outer gimbal 38, together with the necessary supports 39, 40, and 41. The rotation of the slave housing 36 is actuated by a flexible shaft 42 which is enclosed in a tubular housing 43, the shaft being driven by a reversible electric motor 44. In like manner, the inner gimbal 37 is driven by a flexible shaft 45 and a reversible electric motor 46. The outer gimbal 38 may be driven in any suitable manner, such as a gear train consisting of gears 47 and 48 and reversible electric motor 49.

In Fig. 2, electronic sensing elements 50, 51, and 52 are provided for sensing the orientation of the slave housing 36 with respect to the central core 35, the details of the sensing elements to be described hereinafter. Electrical connections to the three sensing elements 50, 51, and 52 extend through flexible shaft 42, which is insulated from its tubular housing 43. The electrical connections continue through a slip ring and brush assembly 53. For purposes of illustration, Fig. 2 is also shown in gimbal-lock position, the entire mechanism within the casing 3' being floated in liquid 2', which matches as closely as possible the specific gravity of the material used in the mechanism.

Referring now to Fig. 3, a central core 54 is positioned inside a slave housing 55, the suspension elements being shown at 4". The gimbal system includes an inner gimbal 56 and an outer gimbal 57 with appropriate bearing supports 58, 59, and 60. In this case, rotations of the slave housing 55 and gimbals 56 and 57 are actuated by respective induction type motors 61, 62, and 63. These motors may consist of aluminum discs driven by induced alternating magnetic fields in a manner similar to the actuation of the ordinary domestic watt-hour meter. The direction of rotation of these induction type motors 61, 62, and 63 can be reversed in any well known manner according to the phase relation of the magnetic field employed. This phase relation and the resulting rotations are controlled by sensing elements 64, 65, and 66 and appropriate external control circuits as will be described below. Electrical contacts with the sensing elements 64, 65, and 66 and induction motors 61, 62, and 63 are brought out through slip ring and brush assemblies 67, 68, 69, and through leads 70. Similar to Figs. 1 and 2, the entire mechanism is floated in a fluid 2" within a housing 3".

Figs. 1, 2, and 3 show three combinations of the four essential elements set forth above. In each case, there is a central core positioned inside a slave housing, a means for sensing the orientation of the slave housing with respect to the central core, and a gimbal system with means for actuating the movement of the slave housing. The fourth element, namely, a means for sensing the orientation of the outer housing 3 with respect to the slave housing, is accomplished in Fig. 1 by noting the angular position of the shafts of electric motors 18, 26, and 30. This information is taken off through gears 71, 72, and 73, respectively, and may be fed into appropriate control devices for use in the guidance of aircraft and missiles. In Fig. 2, a similar sensing means is employed by noting the angular positions of the shafts of motors 44, 46, and 49, the information being taken off through gears 74, 75, and 76, respectively, and fed into appropriate control devices or circuits. In Fig. 3, a somewhat different method is employed since the driving motors are internal. The angular positions of the two gimbal shafts 59 and 60 in Fig. 3, and the slave housing 55, may be determined by incorporating saw-tooth notches or serrations in the edges of the motor discs 77, 78, and 79. As these serrations move under detecting elements 80, 81, and 82, electrical impulses are produced either by electrical contact or by capacitance variations. These impulses may then be totalled in an electronic integrator network providing an index of the angular positions of the discs 77, 78, and 79. By making the saw-toothed structure of the disc edge in such a form that the slope of one side of each tooth is different from the other side thereof and by employing a capacitive detecting element, the electrical wave form produced by movement of the disc will provide an index as to the direction of rotation.

There are several methods of sensing the orientation of the housing relative to the central core. Fig. 4 shows an electrical contact method wherein an electrically conducting fin 83 is mounted on a central core 84. A slave housing 85 carries an assembly of electrical contact points 86 and 87. When the conducting fin 83 is in the central position, no contact is made with points 86 and 87. Any movement of the slave housing 85 to the right will result in electrical contacts between points 86 and the fin 83, while any movement of the slave housing 85 to the left will result in an electrical contact between points 87 and fin 83. The direction of rotation of electric motor 88 is thus determined and will restore the slave housing to a position where the electrical contacts are broken. The motor driving the slave housing or gimbal system, as indicated schematically by arrow 89, is powered by an electrical connection to an energy source connected to terminals 90. Three of these electrical contact systems are required to actuate the orientation of the slave housing around three mutually perpendicular axes.

Referring now to Fig. 5, an optical method is illustrated wherein a beam of light from a light source 91 passes through a slit 92 between reflecting mirrors 99 and 100. The light beam is reflected by concave focusing mirror 93 mounted on a central core 94. The mirror 93 reflects the light beam and focuses the image of the slit 92 back on itself when the core 94 and slave housing 97 are in stable position on suspension elements 98. Should the slave housing 97 move to the right, the mirror 99 will reflect the light beam into a photoelectric cell 95. If the slave housing 97 moves to the left, then the light beam will be reflected by mirror 100 into photoelectric cell 96. By means of external electrical circuits from the photocells, a reversible electric motor will restore the slave housing 97 to "zero" or neutral position. Here again, three such optical systems and three motor drives are required to control the orientation of the slave housing around three mutually perpendicular axes.

Referring now to Fig. 6, an electronic sensing system is shown using a capacitive bridge circuit. In this figure, two capacitor plates 101 and 102 are mounted on slave housing 103 to form a capacitive circuit with a central core 104. A slot 105 is cut in the central core 104 so that any movement of condenser plates 101 and 102 will alter their relative capacity. The bridge circuit includes resistors 106 and 107, resistor 106 being adjustable.

A signal generator 108 applies a sinusoidal signal to the bridge network, the output of which is amplified by an amplifier 109. The signal is also impressed on a phase shifter 110 and combined with the amplified signal from the bridge network and the discriminator circuit 111, the output of which will be "zero" when the bridge is perfectly balanced. Any movement of the slave housing 103 relative to the central core 104 will unbalance the bridge and produce a signal voltage output from discriminator 111, the phase of which will depend upon the direction of movement of the slave housing 103. This output voltage from discriminator 111 is applied to a drive motor 112, the direction of rotation being determined by the phase of the signal. The motor will restore the slave housing 103 to the position where the bridge is precisely balanced. Here again, three bridge networks, three external control circuits, and three motor drives are employed, one for each of the mutually perpendicular axes of the slave housing.

Referring to Fig. 7, three capacitive sensing elements indicated schematically by condensers 113, 114, and 115 are positioned on the slave housing. For example, in Fig. 2, as elements 50, 51, and 52, and in Fig. 3, as elements 64, 65, and 66. Small inductance coils 116, 117, and 118, as indicated in Figs. 2, 3, and 7, are connected with the condenser elements to form three resonant circuits having three separate and distinct resonant frequencies.

Although series resonant circuits are shown in Fig. 7, parallel resonant circuits may also be used, these circuits being connected to three oscillators indicated by block 119, and which are tuned to the resonant frequencies of the three circuits, while the capacitive elements 113, 114, and 115 are in balance or "zero" position. Any movement of the slave housing which carries these capacitive elements may alter their capacity and will change the resonant frequency of one or more of the three circuits.

The three circuits and the oscillators are connected to three detectors indicated schematically by block 120, which are tuned to the three frequencies supplied by oscillators 119 and are so arranged as to detect any reactance changes which may be reflected from the three resonant circuits. For example, if a given circuit comprising elements 113 and 116 is in balance so as to be tuned to the signal as supplied by one of the oscillators 119, this reactance as seen by detector 120 will be purely resistive. If the capacitance of condenser 113 increases due to the movement of the slave housing relative to the central core, the reactance seen by detector 120 develops a capacitive vector component of reactance as seen by detector 120. Detector 120 impresses control signals on motor controls which are indicated by block 121 in such a way that the drive motors, as for example, motors 61, 62, and 63 in Fig. 3, tend to restore the slave housing to position "zero" after any displacement.

With the various constructions and sensing controls described above, the central core can be made insensitive to outside forces linear or angular. A preferred construction is the use of quartz torsion fibers to suspend the core, the fibers being drawn to a diameter of about 10 microns. Then by the use of an electronic method, such as the capacitance bridge circuit shown in Fig. 6, or the resonant circuit shown in Fig. 7, a displacement as small as $10^{-6}$ inches may be detected. Where such extreme sensitivity is not required, fine aluminum coil springs may be used for the suspension elements, 4, 4', and 4". It is also recommended that the outer housings 3, 3', and 3", be constructed of extremely stiff material, such as hardened steel, to minimize dimension changes of the internal parts of the mechanism due to severe shock or acceleration forces.

The operation of the system depends on the inertia of the core 1, or more specifically its tendency to maintain a constant angular displacement or rotation. For example, a five inch diameter solid sphere of aluminum alloy (sp.g.=2.76) will experience an angular acceleration $a$ to approximately 3.7 f. radians per second $^2$ as a result of a force $f$ in ounces acting tangentially to the surface of the sphere. If the reversing motor drive and sensing system is adjusted so that the slave housing continually "hunts" or oscillates around "zero" position with a relatively small logarithmic decrement, then the initial force due to displacement of the suspension system is the only force which needs consideration. By reducing the magnitude of this force $f$ to the practical low value of about $10^{-8}$ ounces, and the duration of the force to a small fraction of a second, the drift rate of the solid core can be reduced to a value of below $10^{-4}$ degrees per hour. A drift rate of this magnitude is considered satisfactory for inertial guidance systems.

In the event that a system of gyroscopes is incorporated in the central core, it is important that the distribution of the mass of the various parts be accurately adjusted so that the center of gravity of the sphere coincides with the geometrical center of the sphere. Also, the gyros must be hermetically sealed and their weight adjusted so their average specific gravity matches that of the rest of the mechanism. Although the use of gyros within the core represents a departure from my objective of maintaining a homogeneous density of material throughout the entire structure, such a departure will not seriously affect the stability of the core. Severe shocks or vibration forces will impose loads on the gyro bearings but will not cause any tendency for the gyros to precess, for the reason that such tendencies would be produced in the gimbal system. The gimbal system is maintained in the desired condition of homogeneous density with respect to the fluid which surrounds it, and is, therefore, unaffected by external forces.

The precession or angular change of the axis of a gyro about 5 inches in diameter and weighing 6.5 pounds and rotating at 10,000 R. P. M. is approximately $8f$ degrees per hour, where $f$ is a force in ounces acting tangentially on the end of the gyro axis. By reducing the force $f$ to a low practical limit of $10^{-6}$ ounces, the precession or drift rate can be reduced well below $10^{-5}$ degrees per hour. This drift rate would result from a constantly applied force. In practice, forces tending to turn the core are applied only intermittently, due to the follow-up action of the slave housing. The theoretical drift rate, therefore, becomes extremely small. Usually three gyros with axes mutually at right angles are employed in devices of this kind, although two gyros with axes at right angles will provide adequate stability.

As stated in the foregoing description, sensing of the orientation of the slave housing relative to the central core can be accomplished by various means, including mechanical, optical, or electronic means, and I, therefore, do not restrict my invention to any specific method. In addition, it is apparent that the physical size or shape of the mechanism and the disposition of gears, gear ratios, motor speeds, or other features may be varied between wide limits.

To those skilled in the art, it is immediately evident that the gimbals may be driven by means other than gears, or flexible shafts. For example, smooth discs or tapered cones may be substituted for the gears, the driving force being transmitted by pressure and friction. It is even possible to employ a system of magnetically coupled wheels or discs in place of the gears, wherein there is no physical contact between the driving and driven elements, the driving force being transmitted by magnetism through an air gap. I, therefore, do not restrict my invention to a specific method of transmitting the gimbal follow-up driving force.

It should be emphasized that many kinds of fluids may be employed to float the mechanism. Depending on the required specific gravity, even water solutions of heavy metallic salts might be employed. Although I have pointed out my preference for mixtures of aliphatic halides, such as diiodomethane, diiodopropane, etc., I do not restrict my invention to such specific materials.

It will be seen from the foregoing specification that I have devised a system for inertial guidance and control which has the advantages of superior sensitivity and simplicity of construction. My system has the further advantage that it is inert to external forces of vibration and acceleration. Essential features of my system are the use of mechanical parts having a uniform specific gravity equal to that of a fluid which fills all empty spaces in the mechanism, a slave housing surrounding a central "stable" core, and a means for mechanically driving the slave housing so that it accurately follows the orientation of the stable core. In practice, the motors which drive the slave housing may also drive indicators or other mechanisms associated with the control of a missile or aircraft. Such auxiliary equipment does not constitute a part of my invention.

Accelerometers or similar devices may be attached to the slave housing with necessary electrical contacts brought out through slip-ring and brush assemblies. An alternative method would be to mount such devices on a separate secondary slave housing which is geared to follow the primary slave housing through an equivalent system of gimbals. If need be, such separate slave housing may be placed at a remote point, as for example, on an instrument panel, and driven by flexible shafts or self-synchronous motors.

I claim:

1. A stable reference platform comprising a central spherical core, a slave housing surrounding said core, means for suspending said core within said housing, and a plurality of gimbals surrounding said slave housing, an outer housing enclosing said core, said slave housing, and said gimbals, said outer housing containing a fluid in which said core, said spherical slave housing, and said gimbals are immersed.

2. A platform in accordance with claim 1 in which the average specific gravity of said central core is substantially equal to said fluid.

3. A platform in accordance with claim 1 in which means are provided for detecting the orientation of said slave housing with respect to said core.

4. A platform in accordance with claim 3 in which means are provided for mechanically rotating said slave housing to maintain its orientation in substantial conformity with said central core.

5. A platform in accordance with claim 4 in which said central core is substantially solid.

6. A platform in accordance with claim 4 in which said central core is a hollow spherical shell.

7. A platform in accordance with claim 1 in which a motor is provided for rotating each of the gimbals with respect to each other and said slave housing with respect to said core.

8. A platform in accordance with claim 7 in which means are provided for indicating the angular positions of the shafts of said motors.

9. A stable reference platform comprising a central spherical core, a slave housing surrounding said core, suspension elements between said housing and said core, a plurality of gimbals surrounding said slave housing, an outer housing having a fluid therein with a specific gravity substantially equal to the average specific gravity of said core, motor means for mechanically rotating said slave housing and said gimbals to maintain said slave housing in substantial conformity with said central core, and means cooperating between said central core and said slave housing for sensing any deviation of conformity between said central core and said slave housing and for energizing said first-mentioned means.

10. A platform in accordance with claim 9 in which said first-mentioned means includes a reversible motor and said last-mentioned means includes a plurality of contacts, the closing of certain contacts being adapted to connect said motor to a power supply for rotating said motor in one direction, and the closing of certain other contacts being adapted to connect said motor to said power supply for rotating said motor in the opposite direction, said contacts being relatively movable with respect to said core.

11. A platform in accordance with claim 9 in which said last-mentioned means includes a pair of light sensitive devices, a source of light, and reflecting means on said core for projecting light to one of said light sensitive devices, depending upon the relative rotation between said core and said slave housing.

12. A platform in accordance with claim 9 in which said last-mentioned means includes a variable capacity unit having a portion thereof connected to said slave housing and another portion to said core, together with a bridge circuit adapted to be unbalanced by relative movement between said core and said slave housing.

13. A stable reference platform comprising a central spherical core, a spherical slave housing surrounding said core, suspension elements connected at a central point in said core and to said slave housing, an interleaved plurality of gimbals on which said slave housing is mounted, an enclosing housing for said core, slave housing and gimbals, and a fluid within said enclosing housing immersing said core, slave housing and gimbals.

14. A stable reference platform in accordance with claim 13 in which said suspension elements are quartz fibers.

15. A stable reference platform in accordance with claim 13 in which an independent gear and shaft system is provided for each gimbal together with an independent drive motor for each system, said motors being mounted externally of said enclosing housing.

16. A stable reference platform in accordance with claim 15 in which the shafts of said gear and shaft systems are flexible shafts interconnecting certain of said motors with certain of said gimbals.

17. A stable reference platform in accordance with claim 13 in which an induction type motor is provided for rotating each of said gimbals, said motors being immersed in said fluid.

18. A stable reference platform in accordance with claim 17 in which the disc of each of said induction type motors is serrated, a detecting element being provided for indicating movement of a respective disc.

19. A stable reference platform comprising a central core, a slave housing surrounding said core, means for maintaining said core centered and free-floating within said slave housing, an interleaved plurality of gimbals on which said slave housing is mounted, an enclosing housing for said core, said slave housing and said plurality of gimbals, and a fluid within said enclosing housing immersing said core, said slave housing and said plurality of gimbals.

20. A platform in accordance with claim 19 in which means are provided for rotating said slave housing to maintain its orientation in substantial conformity with said central core.

References Cited in the file of this patent

UNITED STATES PATENTS

| 1,501,886 | Abbot | July 15, 1924 |
| 1,589,039 | Anschutz-Kaempfe | June 15, 1926 |
| 1,972,882 | Gillmor | Sept. 11, 1934 |
| 2,260,396 | Otto | Oct. 28, 1941 |
| 2,613,538 | Edelstein | Oct. 14, 1952 |
| 2,667,194 | Bishop | May 4, 1954 |
| 2,740,299 | Jewell | Apr. 3, 1956 |